(12) United States Patent
Stroppiana

(10) Patent No.: US 7,354,963 B2
(45) Date of Patent: Apr. 8, 2008

(54) COVERING MATERIAL, CORRESPONDING MANUFACTURING PROCESS AND INTERMEDIATE PRODUCT

(75) Inventor: Fernando Stroppiana, Grinzane Cavour (IT)

(73) Assignee: Mondo S.p.A., Gallo d'Alba (IT)

( * ) Notice: Subject to any disclaimer, the term of this patent is extended or adjusted under 35 U.S.C. 154(b) by 642 days.

(21) Appl. No.: 10/918,204

(22) Filed: Aug. 13, 2004

(65) Prior Publication Data

US 2005/0065236 A1 Mar. 24, 2005

(30) Foreign Application Priority Data

Aug. 13, 2003 (EP) .................. 03425548

(51) Int. Cl.
*C09D 5/29* (2006.01)

(52) U.S. Cl. ..................................... 523/171

(58) Field of Classification Search ................. 523/171
See application file for complete search history.

(56) References Cited

U.S. PATENT DOCUMENTS

| | | | |
|---|---|---|---|
| 4,130,535 A | 12/1978 | Coran et al. ............... | 260/33.6 |
| 4,311,628 A | 1/1982 | Abdou-Sabet et al. ..... | 260/33.6 |
| 6,224,804 B1 | 5/2001 | Schwonke et al. ..... | 264/173.12 |
| 6,251,321 B1 | 6/2001 | Kühl et al. .................... | 264/73 |
| 2001/0005542 A1 | 6/2001 | Graab et al. ................ | 428/147 |

FOREIGN PATENT DOCUMENTS

| | | |
|---|---|---|
| EP | 0 385 053 A2 | 9/1990 |
| EP | 0 968 804 A2 | 1/2000 |
| EP | 1 020 282 A2 | 7/2000 |

OTHER PUBLICATIONS

"Plastic Properties Technical Information", Dynalab Corporation, 2 pages, downloaded Aug. 27, 2007, http://www.dynalabcorp.com/technical_info_1d_polyethylene.asp.
"DOW Low Density Polyethylene (LDPE) Resins", The Dow Chemical Company, 2 pages, downloaded Aug. 27, 2007, http://plastics.dow.com/plastics/ap/prod/polyethylene/ldpe/htm.

*Primary Examiner*—Edward J. Cain
(74) *Attorney, Agent, or Firm*—Seed IP Law Group PLLC

(57) ABSTRACT

A laminar coating material, for example for use as flooring, comprises: a polyolefin matrix having a first colouring; and a phase of particulate elastomer material, such as vulcanized rubber, dispersed in the polyolefin matrix and comprising particles of at least one second colouring, which contrasts with the colouring of the polyolefin matrix. Preferably, the particulate elastomer material in question is in turn obtained starting from a plurality of intermediate mixes, each comprising a polyolefin matrix having a first colouring, in which there is dispersed a respective particulate phase comprising particles of a respective second colouring. The respective second colouring is different for each intermediate mix and contrasts with the aforesaid first colouring. The intermediate mixes are mixed together so as to form a mixture used for obtaining the final material, preferably by means of granulation, formation of a bed of granules, and isostatic pressing of the bed thus formed.

38 Claims, 2 Drawing Sheets

# COVERING MATERIAL, CORRESPONDING MANUFACTURING PROCESS AND INTERMEDIATE PRODUCT

BACKGROUND OF THE INVENTION

1. Field of the Invention

The present invention relates to coating materials, such as for example laminar coating materials which can be used in the building and furnishing sector, in particular for the production of floorings.

2. Description of the Related Art

The wide variety of coating materials of this type so far available may be reduced to three fundamental categories.

The solution that perhaps dates back the furthest is the coating material commonly referred to as linoleum. The corresponding production technique basically envisages adding filler materials such as sawdust and cork dust, mineral fillers, pigments and other additives to linseed oil so as to obtain a so-called linoleum paste. This undergoes rolling in order to form sheets, which then undergo a so-called "maturing" step, which has a duration of some dozens of days and is essentially aimed at achieving a consolidation of the linoleum sheet sufficient to enable its further manipulation and treatment (for example, so as to enable its winding into rolls for subsequent laying).

Although this solution has a long history, it occupies quite a modest market share, both on account of the disadvantages linked to the intrinsic slowness of the maturing process and because, in the steps subsequent to laying, the linoleum flooring tends to release into the environment an intense and characteristic odour linked to the presence of the linseed oil.

A very substantial slice of the market of coatings and floorings is represented by synthetic plastic materials. One of the materials most widely used for making these coatings, which at present may have a contained cost, is represented by polyvinyl chloride (PVC). Irrespective of any other consideration, these floorings, and in particular the PVC-based ones, tend to be viewed with less favour on account of the substances (for example, chlorine) which may be released by the coating and which also have an unpleasant smell.

Over the last few years, rubber-based floorings have encountered particular favour. These floorings enable a combination of excellent characteristics of wear (for example, as regards resistance to mechanical stresses and to aggressive chemical agents, as well as to burns) with the possibility of creating coatings and floorings having a particularly agreeable aesthetic appearance (for example, with general marbleization effects or effects of seeding of granules of various colours). Examples of this prior art are described in the documents EP-A-0 968 804 and EP-A-1 020 282.

Even though to a much smaller extent as compared to the other types of coatings considered previously, also rubber coatings tend to have a rather strong and unpleasant smell, above all immediately following upon laying and on account of the substances used for vulcanizing the rubber.

Over the years there has been no shortage of attempts to merge features characteristic of the various production techniques considered previously. For example, described in the document EP-A-0 385 053 are linoleum coatings with rubber fillers, the main purpose here being to enable exploitation of the process of vulcanizing rubber in order to provide a linoleum coating which can be handled and transferred to the site where it is to be laid in a much shorter time as compared to the characteristic time required for maturing linoleum floorings of a traditional type.

BRIEF SUMMARY OF THE INVENTION

The purpose of the present invention is to provide a coating material which can be used, for example, as flooring and is able to combine the majority of the qualities of coating materials of a traditional type, without presenting the drawbacks thereof.

According to the present invention, the above purpose is achieved thanks to a coating material which has the characteristics referred to specifically in the ensuing claims. The invention relates also to the corresponding process of fabrication, as well as to a corresponding intermediate product.

The coating material described in what follows is able to offer, as regards the characteristics of resistance to environmental agents (mechanical stresses and attack by chemical agents, resistance to burns, etc.), characteristics that are altogether equivalent and, at least in some cases, decidedly superior both to those of plastic coatings and to those of rubber coatings (hence, from this point of view, features that are far superior to those of linoleum coatings).

As regards aesthetic characteristics, the solution described herein enables production of coating materials with chromatic features extending over a practically infinite range, with an extremely wide range of choice also as regards the marbleization effects.

The results of the foregoing process, at least as emerges from the experiments so far conducted by the present applicant, are in many cases qualitatively superior to the results that can be commonly achieved in the case of coatings made of plastic material and of rubber.

Furthermore, the solution described herein has the important advantage afforded by the fact that the finished product is practically odourless. The product can consequently be used without problems of any sort even in environments, such as, hospitals, in which appreciable olfactory effects, albeit in themselves not unpleasant, are however, to be avoided.

The above advantage is achieved in the framework of a process of fabrication which, whether as regards efficiency and economy of production or as regards production times, does not involve any additional burdens over and above those of techniques at present widely used in the industry.

As will be illustrated in greater depth in what follows, the solution described herein envisages adding to a polyolefin matrix (for example, polyethylene) a dispersed phase of particulate material (the so-called "powder") of vulcanized rubber.

Materials based upon this combination are in themselves well known to the art, as is witnessed by the numerous documents, such as U.S. Pat. Nos. 4,130,535 and 4,311,628.

The solutions described in these prior documents aim, however, at creating the so-called "thermoplastic elastomers", i.e., materials that can be used for technological applications, for example in the automobile sector.

The materials obtained in these documents of the known art are suitable for applications typical of elastomers, such as rubber (for example, weather-proofing for windows of motor vehicles, production of hoses for conveying fluids even at high temperatures and pressures, etc.).

For this purpose, the above known solutions emphasize the importance linked to the fact that the elastomer (rubber) particles constitute a phase finely dispersed in the polyolefin matrix with a typical grain size of the elastomer particles that is amply sub-millimetric. For example, U.S. Pat. No. 4,130, 535 indicates as typical size of the rubber particles constituting the dispersed elastomer phase ones in the region of 50 micron.

Persons skilled in the sector may then appreciate that the hypothetical transposition of said known teachings to the context of the present invention comes up against the recognition of the fact that sub-millimetric grain sizes such as the ones referred to previously would in effect be non-appreciable from the visual standpoint. This latter aspect is clearly of primary importance in the application to the sector of coatings to which the present invention refers.

BRIEF DESCRIPTION OF THE DRAWING

The invention will now be described, purely by way of non-limiting example, with reference to the following figures.

DETAILED DESCRIPTION OF THE INVENTION

By way of introduction, it should be recalled that each of the operating steps described in what follows, as well as the equipment that enables implementation thereof, are—taken in themselves—widely known to the prior art. This fact thus renders superfluous any detailed description herein of said operating steps and of the corresponding equipment.

Figure 1:
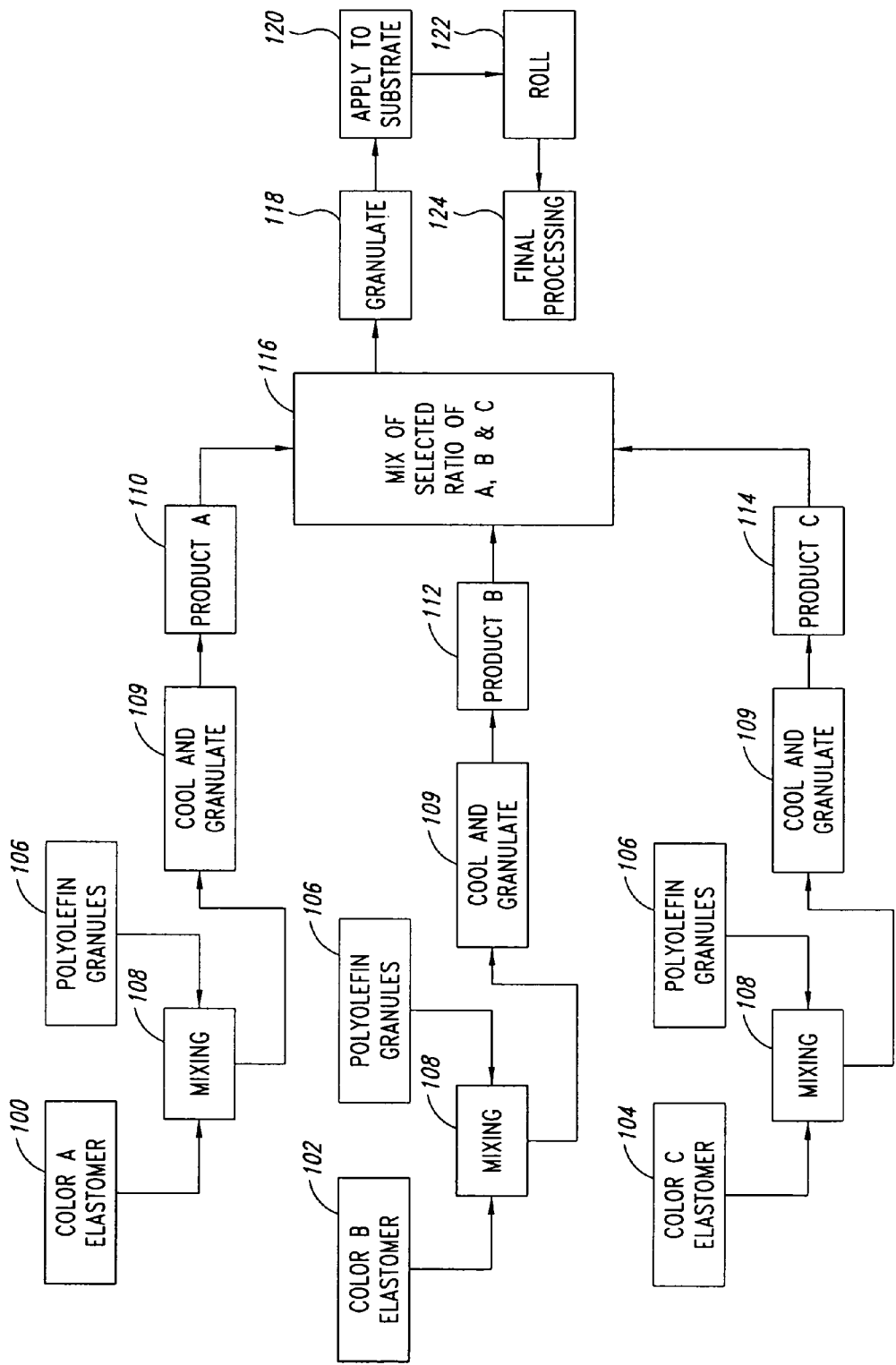
FIG. 1 represents, in the form of a functional block diagram, a preferred embodiment of a process for the production of the material according to the invention.

In the specific case, the process illustrated in FIG. 1 is designed to provide a coating which can be used, for example, as flooring.

In particular, it will be assumed that the aim is to provide a coating with an overall chromatic effect of the type commonly referred to as "marbleized effect". This is thus a coating which presents an appearance somewhat similar to that of a marble with a fine granular structure or, to be perhaps more precise, may be likened to the appearance of granite. Added to this is, of course, the possibility of varying the chromatic characteristics of the coating over a practically infinite range.

Specifically, the coating to which the present description refers comprises a polyolefin matrix (for example polyethylene) having a first colouring. As used herein, the term "colouring" also comprises a material having a neutral and/or substantially transparent colouring.

The overall chromatic effect of the coating is dictated by the presence, in the polyolefin matrix, of granular rubber material (the so-called powder) having a colouring which contrasts with that of the polyethylene matrix.

In what follows, it will be assumed, purely by way of example, that there is available vulcanized rubber material of three different colourings such as black, light grey and dark grey.

The individual granular material may in turn be made up of granules which have, instead of a single colouring, different colourings, obtained for example by the presence, in the individual granule, of portions which have different colourings. Granular materials, in particular rubber materials, which have said marbleized appearance and can be used for example for the so-called "seeding" on a substrate of rubber flooring, are well known to the prior art.

Of course, the fact that the example illustrated herein envisages the use of three different types of granular rubber material must not be interpreted as in any way limiting the possibility of using granular materials in a smaller number (for example, it is possible to envisage the presence of just one type of granular material) or a greater number (for example four or more) as compared to the example provided herein.

The currently preferred embodiment envisages that, starting from each starting granular material such as a powder, it is possible to obtain an intermediate material made up of a granular material the granules of which already combine within them both the polyolefin matrix and the particulate elastomer material, such as a rubber.

In the block diagram represented in FIG. 1 the references 100, 102 and 104 designate precisely three particulate elastomer materials, such as vulcanized rubber with different chromatic characteristics. For example, as has already been said previously, these may be materials which have a prevalent colouring of black (100), light grey (102) and dark grey (104).

The typical size of the particles of the materials 100, 102, 104 are usually comprised between 100 and 500 micron (0.1 to 0.5 mm), the aim being to ensure the visual perceptibility of the granules in the final product.

Reference to the grain sizes indicated above is to be understood in the sense that the materials 100, 102 and 104 contain at least a fraction (and preferably, a substantial fraction) of particles with dimensions comprised between 100 and 500 micron.

On the other hand, said materials may very well comprise also particles of smaller size. The experiments conducted by the present applicant show that these particles of smaller size play a certain role in the overall chromatic result, creating, in the final coating, portions of material which have a colouring that is intermediate between the colourings of the various starting components.

Once again in the attached figure, the reference number 106 designates a granular polyolefin material. This may, for example, be polyethylene, of the currently industrially available low-density type.

Possibly, the polyolefin matrix may be made up of a blend of different polyolefins (for example, polyethylene and polypropylene), with the possible further use, either entirely or in part, of recycled polyolefin material.

The reference numbers 108 and 109 designate treatment steps applied, in an identical or substantially identical way, to all three of the materials 100, 102 and 104.

In particular, the step designated by 108 is a mixing step, in which the elastomer material 100, 102, 104 is mixed with the polyolefin granules 106 with operations of mixing conducted typically at temperatures in the region of 160° C. to 180° C., typically in mixing equipment of the Banbury or continuous-mixer type.

After mixing at temperature, the mix thus obtained is left to cool and subjected to granulation by extrusion.

The above treatment step is designated by the reference number 109 and leads, as final result, to the production of three "intermediate" granular materials 110, 112 and 114 obtained starting from the polyolefin mixture (typically between 5 wt % and 40 wt %, preferably 20 wt %) and the elastomer material 100, 102 and 104 (with weight percentage complementary to that indicated for the polyolefin mixture).

Figure 2:
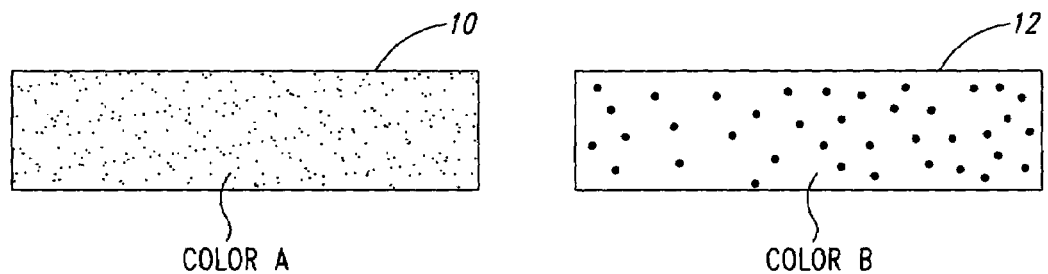
FIG. 2 represents product made in 110, 112 or 114 FIG. 1, according to the invention.

FIG. 2 shows two examples of products 10 and 12 at the stage following the first granulation. Product 10 has color A and product B has color B, each represented by the different cross-sectioning and particle sizes.

The size of the granules of the materials 110, 112 and 114 are typically in the region of 1-4 mm. This factor is not considered to be particularly critical.

Each of the intermediate granular materials 110, 112 and 114 (and any similar material that may be obtained by mixing polyolefin and elastomer materials according to the criteria described previously) constitutes one of the "colours" of a wide range of colours that can be used for the production of the final product.

Intermediate products, such as the products designated by 110, 112 and 114, can then be stocked for subsequent use. Added to the foregoing advantage is the widest possibility of mixing according to the chromatic result that is desired for the final product, both as regards the number and as regards the relative proportions of the intermediate granular products used.

The experiments conducted by the present applicant show that it is in fact possible to obtain a final product containing particulate materials of vulcanized elastomer with different chromatic features simply by mixing these materials having different chromatic characteristics with the polyolefin material of the matrix in a single operation.

The process of mixing in two steps referred to in FIG. 1 (with an initial step in which the individual elastomer material is mixed with the polyolefin to produce an intermediate granular material) proves to be amply preferential as regards the quality of the final product, above all considering the fact that the two-step step process described herein affords the major advantage of preventing an excessively intimate mixing of the various particulate materials 100, 102 and 104.

In this way, the various materials in question contribute to the final chromatic effect of the flooring, each, at the same time, maintaining a precise individuality of its own. The result thus achieved may basically be defined as a sort of greater "luminosity" of the coating obtained as compared to the solutions in which particulate materials of different colouring are directly mixed together along with the polyolefin.

Albeit without wishing to be tied down to any specific theory in this regard, the present applicant has good reasons to believe that the steps designated by 108 and 109 in the annexed drawings lead to bringing about, in the intermediate granular product 110, 112, 114, an at least partial "coating" or "encapsulation" of each particle of elastomer material with a polyolefin layer.

The above polyolefin layer to a certain extent isolates the particle of elastomer material during the successive steps of treatment, so preventing an excessively intimate mixing of the particles of elastomer in the subsequent step, designated by 116 in the annexed block diagram, in which the various intermediate granular materials 110, 112, 114 (the number of which, it is once again recalled, may be any whatsoever) undergo mixing.

This is typically a mixing operation obtained in an extruder starting from relative percentages of the various intermediate granular materials 110, 112 and 114 chosen according to the final characteristics desired for the product.

By way of example (but it is emphasized that this is just one example amongst the infinite possibilities), for the mixing step 116 there may be used 10% of intermediate granular material 110, 30% of intermediate granular material 112, and 60% of intermediate granular material 114. In another example, it may be 40%, 20% and 40%, while in yet another example, it may be 70%, 30% and 0%.

Figure 3:
FIG. 3 represents a product as made in step 118 of FIG. 1.

The final mixed material obtained as the result of step 116 undergoes, in a step designated by 118, an operation of granulation, which precedes a step in which the granular material obtained as the result of step 118 is "seeded" on a substrate, then to undergo rolling in a step designated by 122. FIG. 3 shows the product 18 as it exists in step 118.

Figure 4:
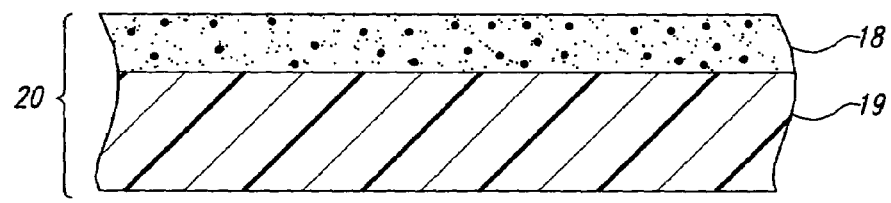
FIG. 4 represents a proposed final product as made in step 122 of FIG. 1.

In a preferred way, the said step of rolling is not conducted using a calander, but rather using an isostatic press. The laminar material obtained by means of isostatic pressing usually has the advantage of being absolutely isotropic, i.e., free from any directional phenomena linked to possible stretching of the granules. FIG. 4 shows a final product 20 that is a laminate of substrate 19 and mixed color product 18. The substrate 19 can be acceptable flooring substrate, such as a PVC, a VCT (vinyl composite tile) resin composite, a hard rubber, or ceramic, or other known floor bases.

Finally, the reference number 124 designates one or more processing steps in which the rolled material is, for example, smoothed or painted (these are, for the most part, altogether optional operations), then to be sent on for packaging, where, for example, it is wrapped in rolls or other forms of packaging that may be convenient for laying.

The table provided in what follows is aimed at highlighting, with reference to some measurement methods that form the subject of well-known reference standards, which are familiar to persons skilled in the sector, the improvement that can be appreciated from direct comparison of various characteristics of a resilient rubber flooring and a flooring made according to the solution described herein.

| Property | Method | Unit of measure | Rubber | New Product |
|---|---|---|---|---|
| Thickness | UNI EN 428 | mm | 2.0 | 2.0 |
| Hardness | ISO 7619 | Shore TO | 90 | 94 |
| Residual impression | UNI EN 433 | mm | <0.11 | <0.05 |
| Wear resistance | ISO 4649 Method A | mm³ | 160-180 | 50-80 |
| Dimensional stability | UNI EN 434 | % | <0.4 | <0.1 |

It will moreover be appreciated that the solution described herein is likewise characterized by the ample possibility of recycling the material, above all within the production cycle, and/or by the generalized type of elastomers that can be used in the vulcanized rubber powder: natural rubber NR, SBR, EPM, EPDM, IR, BR, CR and NBR.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Of course, without prejudice the principle of the invention, the details of production and the embodiments may widely vary with respect to what is described and illustrated herein, without thereby departing from the scope of the present invention as defined in the annexed claims.

The invention claimed is:

1. A laminar coating material comprising:
a polyolefin matrix having a first colouring; and
a phase of particulate elastomer material dispersed in said polyolefin matrix, said particulate phase having particles of at least one second colouring, which contrasts with said first colouring, the particles of said phase of elastomer material having, at least in part, dimensions between 100 and 500 microns.

2. The material according to claim 1, characterized in that said elastomer material is vulcanized elastomer material.

3. The material according to claim 1, characterized in that said phase of elastomer material comprises particles of elastomer material with at least two different colourings, which contrast with said first colouring.

4. The material according to claim 1, characterized in that the part of said particles of said phase of elastomer with dimensions comprised between 100 and 500 micron constitutes a substantial part of said phase of elastomer material.

5. The material according to claim 1, characterized in that said polyolefin is chosen in the group consisting of polyethylene, polypropylene, and mixtures thereof.

6. The material according to claim 5, characterized in that said polyolefin is substantially polyethylene.

7. The material according to claim 5, characterized in that said polyolefin is substantially low-density polyethylene.

8. The material according to claim 1, characterized in that said first colouring is a substantially neutral colouring.

9. The material according to claim 1, characterized in that said first colouring is a substantially transparent colouring.

10. The material according to claim 1, characterized in that said elastomer is chosen in the group made up of natural rubber NR, SBR, EPM, EPDM, IR, BR, CR and NBR, and mixtures thereof.

11. The material according to claim 1, characterized in that said elastomer is rubber.

12. A process for making a coating material, characterized in that it comprises the operations of:
providing a mixture of a polyolefin matrix having a first colouring, in which there is dispersed a phase of particulate elastomer material comprising particles of at least one second colouring, which contrasts with said first colouring;
forming, starting from said mixture, a laminar coating material;
forming a plurality of intermediate mixes each comprising a polyolefin matrix having a first colouring, in which there is dispersed a respective particulate phase comprising particles of a respective second colouring, said respective second colouring being different for each intermediate mix and contrasting with said first colouring; and
mixing said intermediate mixes so as to form said mixture.

13. The process according to claim 12, characterized in that said elastomer material is vulcanized elastomer material.

14. The process according to claim 12, characterized in that it comprises the operations of:
subjecting said mixture to granulation so as to form granules of said mixture;
forming a bed of said granules of said mixture; and
subjecting said bed to pressing so as to form said laminar coating material.

15. The process according to claim 14, characterized in that it comprises the operation of subjecting said bed to isostatic pressing so as to form said laminar coating material.

16. The process according to claim 12, characterized in that said intermediate mixes comprise from 5 to 40 wt % of polyolefin.

17. The process according to claim 12, characterized in that said intermediate mixes comprise approximately 20 wt % of polyolefin.

18. The process according to claim 12, characterized in that it comprises the operation of forming said intermediate mixes by mixing said polyolefin matrix and said respective particulate phase at a temperature between approximately 160 degrees Celsius and approximately 180 decrees Celsius.

19. The process according to claim 12, characterized in that it comprises the operations of:
subjecting said intermediate mixes to granulation so as to form granules of said intermediate mixes; and
mixing the granules of said intermediate mixes so as to form said mixture.

20. The process according to claim 12, characterized in that the particles of said phase of elastomer material have, at least in part, dimensions comprised between 100 and 500 micron.

21. The process according to claim 20, characterized in that the part of said particles of said phase of elastomer with dimensions comprised between 100 and 500 micron constitutes a substantial part of said phase of elastomer material.

22. The process according to claim 12, characterized in that said polyolefin is chosen in the group made up of polyethylene, polypropylene, and mixtures thereof.

23. The process according to claim 22, characterized in that said polyolefin is substantially polyethylene.

24. The process according to claim 22, characterized in that said polyolefin is substantially low-density polyethylene.

25. The process according to claim 12, characterized in that said first colouring is a substantially neutral colouring.

26. The process according to claim 12, characterized in that said first colouring is a substantially transparent colouring.

27. The process according to claim 12, characterized in that said elastomer is chosen in the group made up of natural rubber NR, SBR, EPM, EPDM, IR, BR, CR and NBR, and mixtures thereof.

28. The process according to claim 12, characterized in that said elastomer is rubber.

29. An intermediate product of the process according to claim 12, said intermediate product comprising at least one of said intermediate mixes.

30. The intermediate product according to claim 29, in combination with at least one other intermediate product of the plurality of intermediate products, the at least one other intermediate product comprising at least one of said intermediate mixes, the intermediate products of the combination including respective particulate phases comprising particles with respective second colourings different from one another.

31. A laminar coating material comprising:
a polyolefin matrix having a first colouring, said polyolefin being chosen from the group consisting of polyethylene, polypropylene, and mixtures thereof; and
a phase of particulate elastomer material dispersed in said polyolefin matrix, said particulate phase comprising particles of at least one second colouring, which contrasts with said first colouring.

32. The material according to claim 31, characterized in that said polyolefin is substantially polyethylene.

33. The material according to claim 31, characterized in that said polyolefin is substantially low-density polyethylene.

34. A process for making a coating material, characterized in that it comprises the operations of:
providing a mixture of a polyolefin matrix having a first colouring, in which there is dispersed a phase of particulate elastomer material comprising particles of at least one second colouring, which contrasts with said first colouring, the particles of said phase of elastomer material have, at least in part, dimensions between 100 and 500 micron, and forming, starting from said mixture, a laminar coating material.

35. The process according to claim 34, characterized in that the part of said particles of said phase of elastomer with dimensions comprised between 100 and 500 micron constitutes a substantial part of said phase of elastomer material.

36. A process for making a coating material, characterized in that it comprises the operations of:

providing a mixture of a polyolefin matrix having a first colouring, in which there is dispersed a phase of particulate elastomer material comprising particles of at least one second colouring, which contrasts with said first colouring, said polyolefin being chosen from the group consisting of polyethylene, polypropylene, and mixtures thereof; and forming, starting from said mixture, a laminar coating material.

37. The process according to claim 36, characterized in that said polyolefin is substantially polyethylene.

38. The process according to claim 36, characterized in that said polyolefin is substantially low-density polyethylene.

* * * * *

UNITED STATES PATENT AND TRADEMARK OFFICE
CERTIFICATE OF CORRECTION

| | | |
|---|---|---|
| PATENT NO. | : 7,354,963 B2 | Page 1 of 1 |
| APPLICATION NO. | : 10/918204 | |
| DATED | : April 8, 2008 | |
| INVENTOR(S) | : Fernando Stroppiana | |

It is certified that error appears in the above-identified patent and that said Letters Patent is hereby corrected as shown below:

Column 8
Line 5, "180 decrees Celsius" should read as --180 degrees Celsius--.

Signed and Sealed this

Twenty-first Day of April, 2009

JOHN DOLL
*Acting Director of the United States Patent and Trademark Office*